US012313412B2

(12) United States Patent
Sai

(10) Patent No.: US 12,313,412 B2
(45) Date of Patent: May 27, 2025

(54) ROUTE GUIDANCE DEVICE AND MaaS PROVIDING METHOD

(71) Applicant: TOYOTA JIDOSHA KABUSHIKI KAISHA, Toyota (JP)

(72) Inventor: Seii Sai, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/631,494

(22) Filed: Apr. 10, 2024

(65) Prior Publication Data

US 2025/0012580 A1    Jan. 9, 2025

(30) Foreign Application Priority Data

Jul. 4, 2023   (JP) .................................. 2023-110302

(51) Int. Cl.
  *G06Q 30/0283* (2023.01)
  *G01C 21/34* (2006.01)

(52) U.S. Cl.
  CPC ..... *G01C 21/3423* (2013.01); *G06Q 30/0284* (2013.01)

(58) Field of Classification Search
  CPC .................. G01C 21/3423; G06Q 30/0284
  See application file for complete search history.

(56) References Cited

U.S. PATENT DOCUMENTS

| 2017/0236138 | A1* | 8/2017 | Yamato | G06Q 30/0207 |
| | | | | 705/7.19 |
| 2019/0342704 | A1* | 11/2019 | Pylappan | H04W 4/025 |
| 2019/0360824 | A1* | 11/2019 | Sai | G01C 21/30 |
| 2020/0104761 | A1* | 4/2020 | Aich | G06Q 20/322 |
| 2020/0249027 | A1* | 8/2020 | Schmidt | H04W 4/024 |
| 2020/0250966 | A1* | 8/2020 | Rom | G08G 1/0133 |
| 2021/0270617 | A1* | 9/2021 | Spielman | H04W 4/021 |
| 2021/0350341 | A1* | 11/2021 | Song | G06Q 20/0457 |
| 2022/0198537 | A1* | 6/2022 | Edwards | G01C 21/343 |

FOREIGN PATENT DOCUMENTS

| JP | 2019-207118 A | | 12/2019 |
| JP | 2022124378 A | * | 8/2022 |
| WO | WO-2023002764 A1 | * | 1/2023 |

OTHER PUBLICATIONS

Thiagarajan, Arvind, et al. "Cooperative transit tracking using smart-phones." Proceedings of the 8th ACM conference on embedded networked sensor systems. 2010 (Year: 2010).*

* cited by examiner

*Primary Examiner* — George Chen
(74) *Attorney, Agent, or Firm* — Oliff PLC

(57) ABSTRACT

The route guidance device guides the route to the user based on the destination information and the departure point information. The route guidance device determines, based on the location information of the vehicle associated with the route selected by the user and the location information of the user, whether the user has ridden on the vehicle associated with the route selected by the user.

5 Claims, 6 Drawing Sheets

ROUTE GUIDANCE DEVICE AND MaaS PROVIDING METHOD

CROSS-REFERENCE TO RELATED APPLICATION

This application claims priority to Japanese Patent Application No. 2023-110302 filed on Jul. 4, 2023, incorporated herein by reference in its entirety.

BACKGROUND

1. Technical Field

The present disclosure relates to route guidance devices and Mobility as a Service (MaaS) providing methods.

2. Description of Related Art

As described in Japanese Unexamined Patent Application Publication No. 2019-207118 (JP 2019-207118 A), a device that proposes a travel route to a user based on information on a destination and a departure point is known in the art.

SUMMARY

When a user gets on a vehicle, an action such as touching an integrated circuit (IC) card is required, which hinders seamless travel of the user. There is room for improvement in allowing more seamless travel of users.

It is an object of the present disclosure to implement more seamless travel.

A route guidance device according to an embodiment of the present disclosure provides route guidance to a user based on information on a destination and information on a departure point.

The route guidance device determines whether the user has gotten on a vehicle associated with a route selected by the user, based on location information of the vehicle associated with the route selected by the user and location information of the user.

A Mobility as a Service (MaaS) providing method according to an embodiment of the present disclosure uses the above route guidance device.

According to the present disclosure, more seamless travel is implemented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
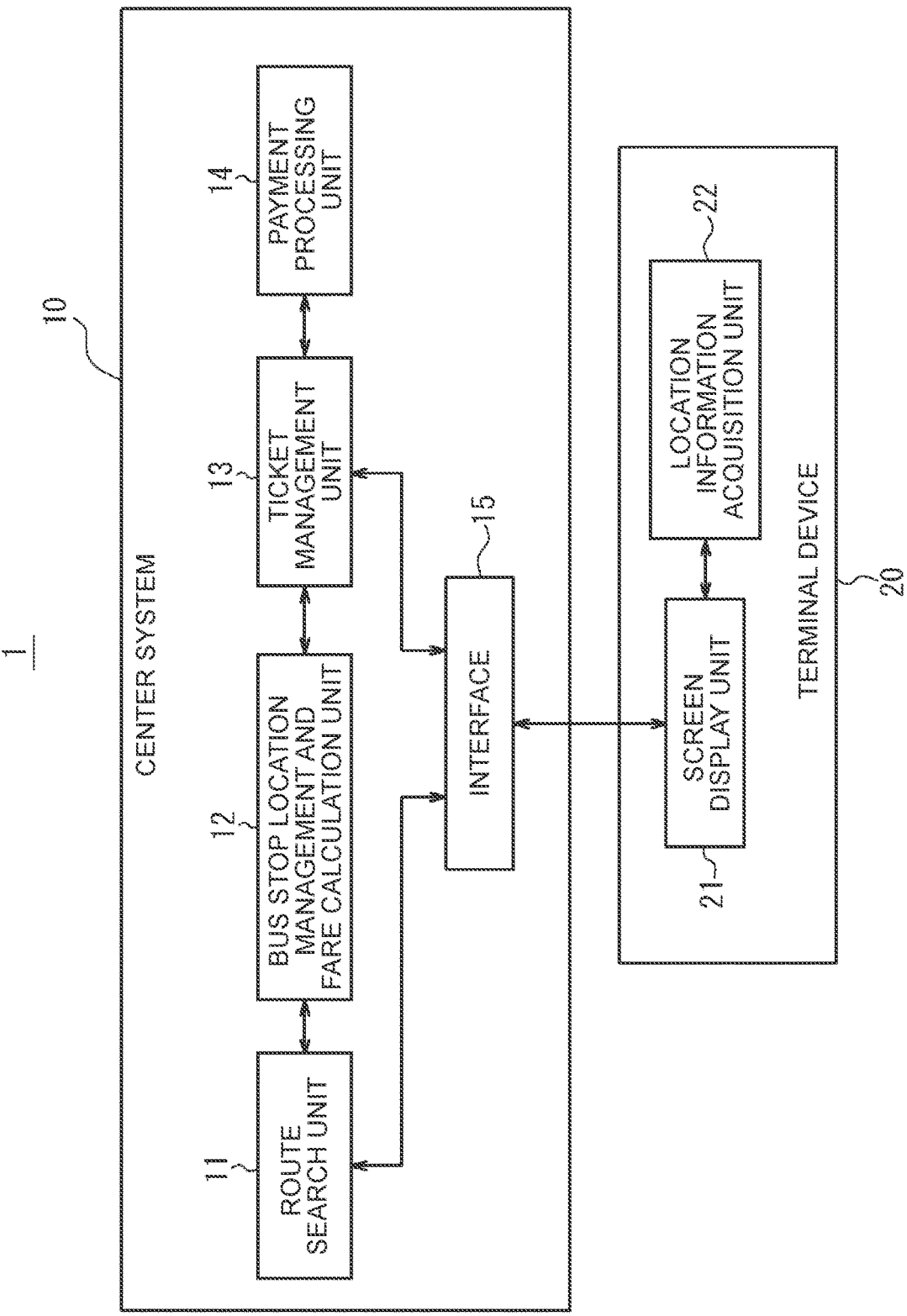
FIG. 1 is a block diagram illustrating a configuration example of an information processing system according to an embodiment.

An application software executed by a smartphone or the like may sell a free ticket that allows a user to use a vehicle such as a bus within a predetermined range. In this case, since the amount of the free ticket is predetermined, the free ticket is sold without any problem.

On the other hand, application software executed by a smartphone or the like may sell a one-way ticket for a user to ride on a vehicle such as a bus. When a fare is calculated according to a distance traveled by a user by riding on a vehicle, calculation and payment processing of a fare are required based on a landing such as a bus stop at which the user rides on the vehicle and a landing such as a bus stop at which the user gets off the vehicle. Therefore, there is a need for a fare calculation system and a payment system.

As the bus fare calculation system and the payment system according to the comparative embodiment, in order to specify a bus stop in which the user gets on the bus and a bus stop in which the user gets off the bus, it is conceivable to cause the user to touch an Integrated Circuit (IC) card with a reader of the IC card installed at the entrance and exit of the bus. In addition, it is conceivable that the user is allowed to acquire the numbered tickets from the distribution machine of the numbered tickets installed at the entrance of the bus. That is, the fare calculation system and the payment system of the bus according to the comparative example require the physical operation of the user.

Here, in order to realize the fare calculation system and the payment system by the application software executed on the smartphone, the application software needs to specify a bus stop at which the user gets on the bus and a bus stop at which the user gets off the bus.

However, it is difficult to install a module that communicates with the smartphone on the bus. Therefore, it is difficult to make the application software of the smartphone communicate with the terminal of the bus in order to specify the bus stop where the user gets on the bus and the bus stop where the user gets off the bus. It is also conceivable to input getting on or off the application software when the user gets on or off the bus. However, asking the user for input reduces the convenience of the user. There is also a problem with the accuracy of the input.

According to an embodiment of the present disclosure, the fare calculation and the payment when the user rides on the vehicle are realized by the application software of the smartphone without requiring the physical operation of the user or the input of the user.

Embodiments of the present disclosure include a route guidance device that guides a route in which a user travels from a departure point to a destination. The route guidance device may search a route for the user to move from the departure point to the destination by inputting the departure point and the destination, present a search result of the at least one route as a candidate route, and cause the user to select the route. The route guidance device may identify a point at which the user gets into the vehicle and a point at which the user gets out of the vehicle on the basis of the search result of the route and the location information of the user when the selected route includes a route for getting into the vehicle, and perform calculation and payment processing of the fare.

The vehicle may include a transportation facility, such as a bus or train, that is charged for a boarding point and a fare corresponding to the boarding point and the alighting point. Hereinafter, an embodiment in which the vehicle is a bus will be described.

Configuration Example of Information Processing System 1

As illustrated in FIG. 1, an information processing system 1 according to an embodiment of the present disclosure includes a center system 10 and a terminal device 20. The center system 10 may function as the route guidance device described above. That is, the route guidance device may be configured to include the center system 10. The route guidance device may further include a terminal device 20. The route guidance device may be configured as a device in which the center system 10 and the terminal device 20 are integrated.

Center System 10

The center system 10 includes a route search unit 11, a bus stop location management and fare calculation unit 12, a ticket management unit 13, a payment processing unit 14, and an interface 15.

The route search unit 11, the bus stop location management, and the fare calculation unit 12 are connected to each other. The bus stop location management and fare calculation unit 12 and the ticket management unit 13 are connected to each other. The ticket management unit 13 and the payment processing unit 14 are connected to each other. Each of the route search unit 11 and the ticket management unit 13 is connected to the interface 15. The interface 15 is communicably connected to the terminal device 20. That is, the route search unit 11 and the ticket management unit 13 are communicably connected to the terminal device 20 via the interface 15.

The route search unit 11 searches for a route in response to a request from the user. The bus stop location management and fare calculation unit 12 manages the location of the bus stop in the route using the bus, and calculates the fare when the user gets on the bus between the bus stops. When the user selects a route using the bus, the ticket management unit 13 manages a ticket indicating that the user gets on the bus. The payment processing unit 14 processes a payment of a fare.

The route search unit 11, the bus stop location management and fare calculation unit 12, the ticket management unit 13, or the payment processing unit 14 may be configured to include either a processor or a dedicated circuit, or may be configured to include both a processor and a dedicated circuit. According to the present embodiment, the "processor" is a general-purpose processor, a dedicated processor specialized for specific processing, or the like. However, the processor is not limited thereto. The dedicated circuitry may include, for example, Field-Programmable Gate Array (FPGA) or Application Specific Integrated Circuit (ASIC).

The center system 10 may further include a storage unit. The storage unit may include, for example, a semiconductor memory, a magnetic memory, an optical memory, or the like, but is not limited thereto. The storage unit may function as, for example, a main storage device, an auxiliary storage device, or a cache memory. The storage unit May include an electromagnetic storage medium such as a magnetic disk. The storage unit may include a non-transitory computer-readable medium. The storage unit stores any information or program used for the operation of the center system 10. The storage unit may store, for example, a system program or a program of application software. The storage unit may be included in a processor or a dedicated circuit.

The interface 15 communicably connects the center system 10 and the terminal device 20. The interface 15 may include a communication module. The communication module may correspond to a wired or wireless communication standard. The communication module may correspond to a mobile communication standard including, for example, 4th Generation (4G) or 5th Generation (5G). The communication module may correspond to a communication standard of, for example, Local Area Network (LAN). The communication module is not limited to this and may conform to various communications standards. The interface 15 may be configured to be connectable to an external communication device.

The center system 10 may be configured to include one server device or a plurality of server devices that can communicate with each other. The center system 10 may be implemented as a cloud server. The number of center systems 10 included in the information processing system 1 is not limited to one, and may be two or more.

Terminal Device 20

The terminal device 20 is carried by the user. The terminal device 20 includes a screen display unit 21 and a location information acquisition unit 22. The screen display unit 21 is communicably connected to the interface 15 of the center system 10. The screen display unit 21 and the location information acquisition unit 22 are connected to each other.

The terminal device 20 may include a control unit that controls each component of the terminal device 20. The control unit may be configured to include one of a processor and a dedicated circuit, or may be configured to include both a processor and a dedicated circuit. The processor may be configured the same as or similar to the processor of the center system 10. The dedicated circuitry may be configured the same as or similar to the dedicated circuitry of the center system 10. In this embodiment, it is assumed that the control unit is included in the screen display unit 21.

The screen display unit 21 outputs the information acquired from the center system 10 as visual information such as an image, characters, figures, or the like. The display unit 21 may be configured to include, for example, Liquid Crystal Display (LCD), an organic Electro-Luminescence (EL) display, an inorganic EL display, or a Plasma Display Panel (PDP). The screen display unit 21 is not limited to these displays, and may be configured to include displays of various other types.

The location information acquisition unit 22 includes one or more devices that acquire location information of the terminal device 20. The location information acquisition unit 22 outputs the location information of the terminal device 20 to the center system 10. The location information of the terminal device 20 corresponds to the location information of the user carrying the terminal device 20. That is, the location information acquisition unit 22 acquires the location information of the user who possesses the terminal device 20 and outputs the acquired location information to the center system 10. The location information acquisition unit 22 may include a receiver corresponding to the satellite positioning system. A receiver corresponding to the satellite positioning system may be configured to include, for example, a Global Positioning System (GPS) receiver or the like, but is not limited thereto, and may be configured to include various other receivers. The location information acquisition unit 22 may constantly acquire the location information of the terminal device 20 and output the acquired location information to the center system 10, or may periodically or irregularly acquire the location information and output the acquired location information to the center system 10.

The terminal device 20 may further include an input device that receives input of information, data, or the like from a user. The input device may be configured to include, for example, a touch panel or a touch sensor, or a pointing device such as a mouse. The input device may be configured as a touch display integrated with the display of the screen display unit 21. The input device may be configured to include a physical key. The input device may be configured to include a voice input device such as a microphone.

The terminal device 20 may output the input information to the center system 10. The center system 10 may be configured to be connectable to an input device of the terminal device 20 by the interface 15. The center system 10 may acquire information or data input to an input device of the terminal device 20 via the interface 15.

In addition to the screen display unit 21, the terminal device 20 may include an output device that outputs information, data, or the like to a user. The output device may include, for example, an audio output device such as a speaker that outputs auditory information such as audio. The output device is not limited to the examples above, and may include various other devices.

The terminal device 20 may include a mobile terminal such as a smart phone or a tablet, or a Personal Computer (PC) such as a notebook PC or a tablet PC. The terminal device 20 is not limited to the examples above, and may be configured to include various devices. The number of terminal devices 20 included in the information processing system 1 is not limited to one, and may be two or more.

Bus Information Management Systems 31 and 32

Figure 2:
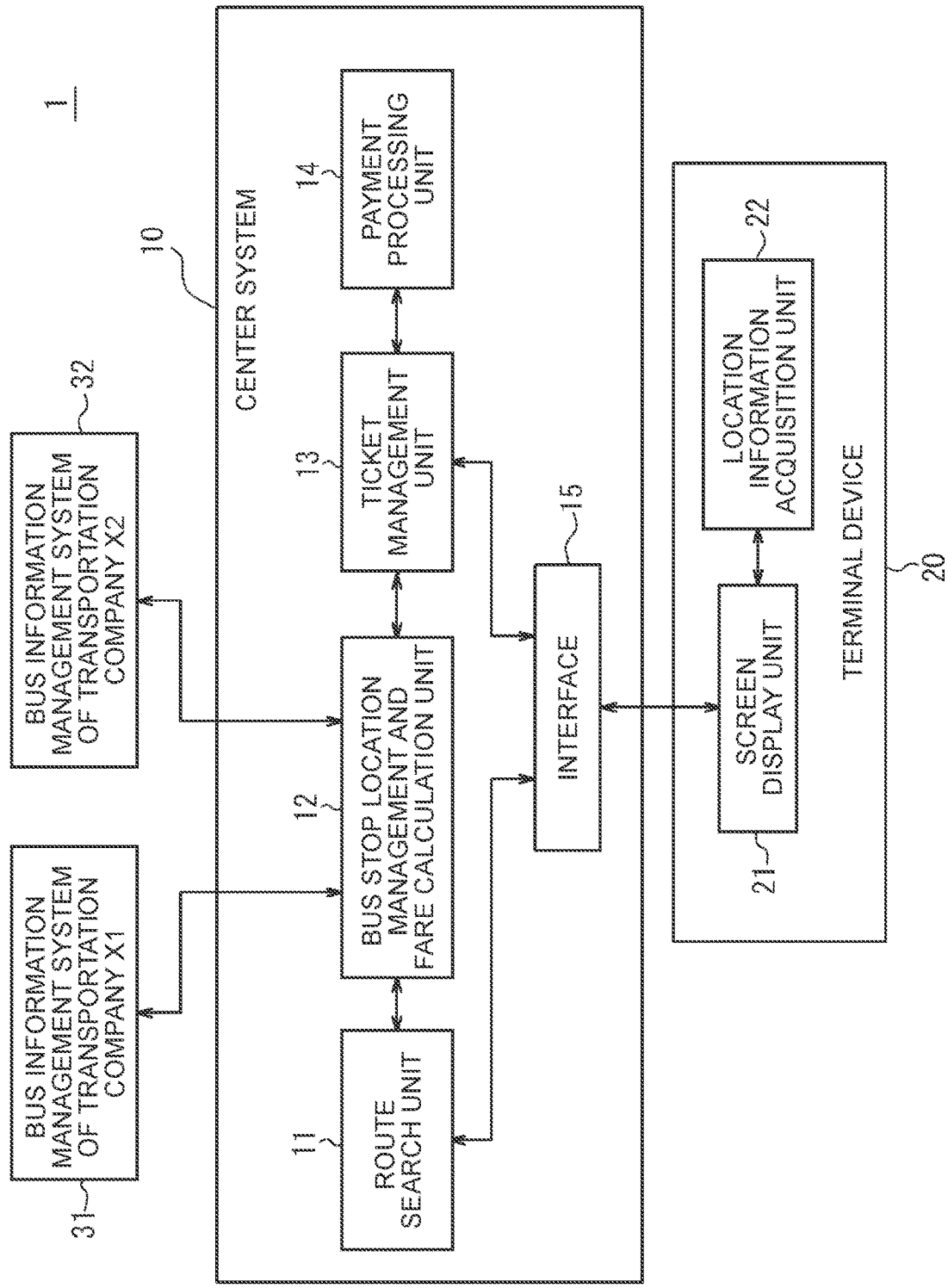
FIG. 2 is a block diagram illustrating a configuration example of an information processing system according to another embodiment.

As illustrated in FIG. 2, the information processing system 1 according to another embodiment further includes a bus information management system 31 of the transportation company X1 and a bus information management system 32 of the transportation company X2 in addition to the center system 10 and the terminal device 20. The bus information management system 31 of the transportation company X1 and the bus information management system 32 of the transportation company X2 manage an operation route or an operation schedule of the bus, or a fare of the bus.

The bus information management system 31 of the transportation company X1 provides the latest information on the operation route or the operation schedule of the bus of the transportation company X1 or the fare by inputting or updating the information by the person in charge of the transportation company X1. The bus information management system 32 of the transportation company X2 provides the most up-to-date information on the operation route or the operation schedule of the bus of the transportation company X2 or the fare by inputting or updating the information by the person in charge of the transportation company X2.

The bus information management system 31 or 32 may be configured to include one server device or a plurality of server devices that can communicate with each other. The bus information management system 31 or 32 may be implemented as a cloud server. The information processing system 1 may not include the bus information management system 31 or 32. In the information processing system 1, the route guidance device may acquire the location information of the bus operated by the transportation company X1 or X2.

Configuration Example of Information Processing System 1

As described above, in the information processing system 1, the route guidance device may present the search result of the route for the user to move from the departure point to the destination as the candidate route, and cause the user to select the route. When the user gets on the bus in the middle of the selected route, the route guidance device may identify a bus stop at which the user gets on the bus and a bus stop at which the user gets off the bus based on the search result of the route and the location information of the user, and may calculate a fare of the bus and processes a payment of the fare.

When the bus section is included in the route selected by the user, the bus running the bus section is associated with the route selected by the user. That is, the bus associated with the route selected by the user is a bus that operates a bus section included in the route selected by the user. The route guidance device may determine, based on the location information of the bus associated with the route selected by the user and the location information of the user, whether the user has ridden on the bus associated with the route selected by the user. In addition, the route guidance device may specify a bus stop at which the user gets off the bus when the user gets off the bus, and processes a payment of the fare of the bus.

Example of Operation of Center System 10

Figure 3:
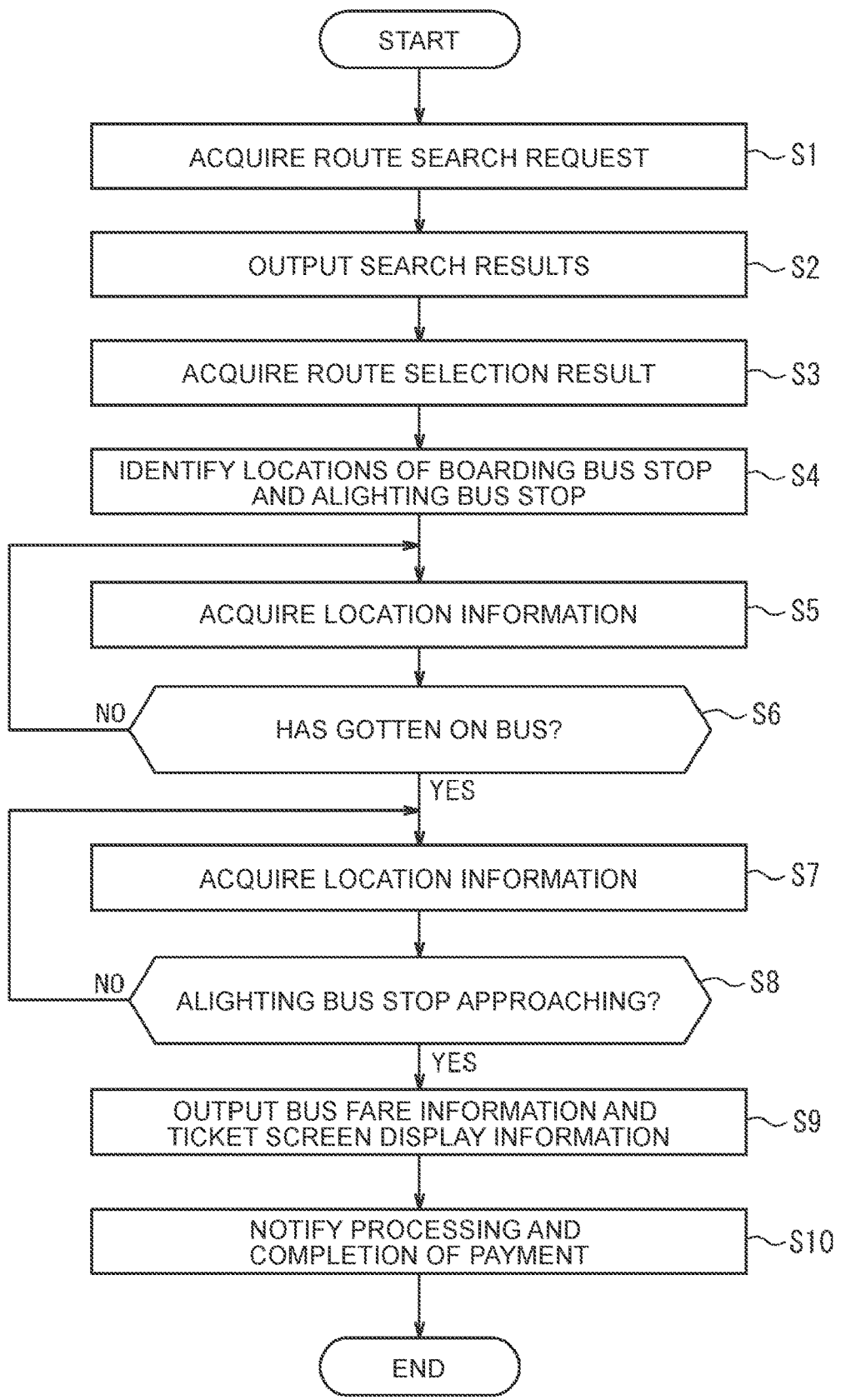
FIG. 3 is a flowchart illustrating an example procedure of a method performed by a center system.

The center system 10 functioning as a route guidance device may execute a route guidance method including the procedure of the flowchart illustrated in FIG. 3 in order to guide a route traveled by a user. The route guidance method may be implemented as a route guidance program executed by a processor of the center system 10. The route guidance program may be stored in a non-transitory computer-readable medium.

The center system 10 acquires a route search request from the terminal device 20 via the interface 15 (S1). The route search request includes the user's departure point and destination. The request for a route search may include a departure time or a desired arrival time of the user.

The center system 10 searches for a route by the route search unit 11, and outputs a search result of the route to the terminal device 20 via the interface 15 (S2). The center system 10 may output at least one route as a candidate route. The center system 10 searches for a route based on operation information of the bus, such as an operation route of the bus or an operation schedule. The center system 10 may store the bus operation information in the storage unit in advance, or may manage the bus stop location management and the fare calculation unit 12. As illustrated in FIG. 2, the center system 10 may access the bus information management system 31 of the transportation company X1 or the bus information management system 32 of the transportation company X2 by the bus stop location management and fare calculation unit 12 to obtain bus operation information. When the center system 10 accesses the bus information management system 31 or 32, the management and updating of the bus operation information can be left to each transportation company. As a result, the burden on the route guidance device is reduced.

The center system 10 acquires the route selection by the user from the terminal device 20 via the interface 15 (S3). The user may select one route from at least one candidate route in the terminal device 20. When the bus section is included in the route selected by the user, the center system 10 may consider that the ticket for the bus section has been purchased. However, it is assumed that processing of a payment for the ticket for the bus section is not executed at this time. Therefore, the center system 10 may consider that the purchase of the ticket for the bus section has been reserved. The center system 10 manages the purchase or reservation of the ticket in the bus section by the ticket management unit 13.

When a route using a bus is included in a route selected by the user, the center system 10 identifies, using the bus stop location management and the fare calculation unit 12, the location of the bus stop where the user gets on the bus and the location of the bus stop where the user gets off the bus (S4). A bus stop at which a user gets on a bus is also referred to as a boarding bus stop. A bus stop at which a user gets off the bus is also referred to as an off-bus stop.

The center system 10 acquires the location of the user from the terminal device 20 (S5). The center system 10 determines whether the user has ridden on the bus based on the location of the boarding bus stop and the location of the user (S6). The center system 10 may determine that the user has boarded the bus when the user arrives within a predetermined range from the boarding bus stop and thereafter the location of the user moves along the bus route. The predetermined range may be, for example, a range in which the distance between the boarding bus stop and the user is equal to or less than the predetermined distance. The predetermined distance may be set to, for example, a 20 m, but is not limited thereto, and may be set to various lengths. If it is not determined that the user has ridden the bus (S6: NO), the center system 10 returns to the step of acquiring the location data of the user (S5).

When it is determined that the user has ridden on the bus (S6: YES), the center system 10 acquires the location data of the user from the terminal device 20 (S7). The center system 10 determines whether the user has approached the alighting bus stop based on the location of the alighting bus stop and the location information of the user (S8). The center system 10 may determine that the user has approached the alighting bus stop when the bus on which the user is boarding falls within a predetermined range from the alighting bus stop. The predetermined range may be, for example, a range in which the distance between the alighting bus stop and the user is equal to or less than the predetermined distance. The predetermined distance may be set to, for example, a 20 m, but is not limited thereto, and may be set to various lengths. If the center system 10 does not determine that the bus on which the user is boarding is approaching the alighting bus stop (S8: NO), the center system returns to the step of acquiring the location information of the user (S7).

If the center system 10 determines that the bus on which the user is riding is approaching the bus stop (S8: YES), it predicts that the user will get off the bus shortly. The center system 10 calculates the fare from the boarding bus stop to the alighting bus stop by the bus stop location management and the fare calculation unit 12. The center system 10 outputs the bus fare information and the ticket screen display information to the terminal device 20 through the interface 15 by the ticket management unit 13 (S9). The bus fare information is information on a bus fare. The boarding ticket screen display information is information for displaying the boarding ticket from the boarding bus stop to the alighting bus stop on the screen.

The terminal device 20 displays the bus fare information and the boarding ticket screen display information on the screen display unit 21, receives an instruction to process a payment of the fare from the user, and notifies the center system 10 of the instruction. When an instruction to process a payment of the fare is acquired from the terminal device 20, the center system 10 processes a payment by the payment processing unit 14 and notifies the terminal device 20 that the payment is completed (S10). The terminal device 20 displays a payment completion notification on the screen display unit 21. The user displays a screen displaying a payment completion notification to the driver of the bus and gets off the bus. After the execution of S10 procedure, the center system 10 terminates the execution of the procedure of the flow chart of FIG. 3.

Example of Operation of Terminal Device 20

Figure 4:
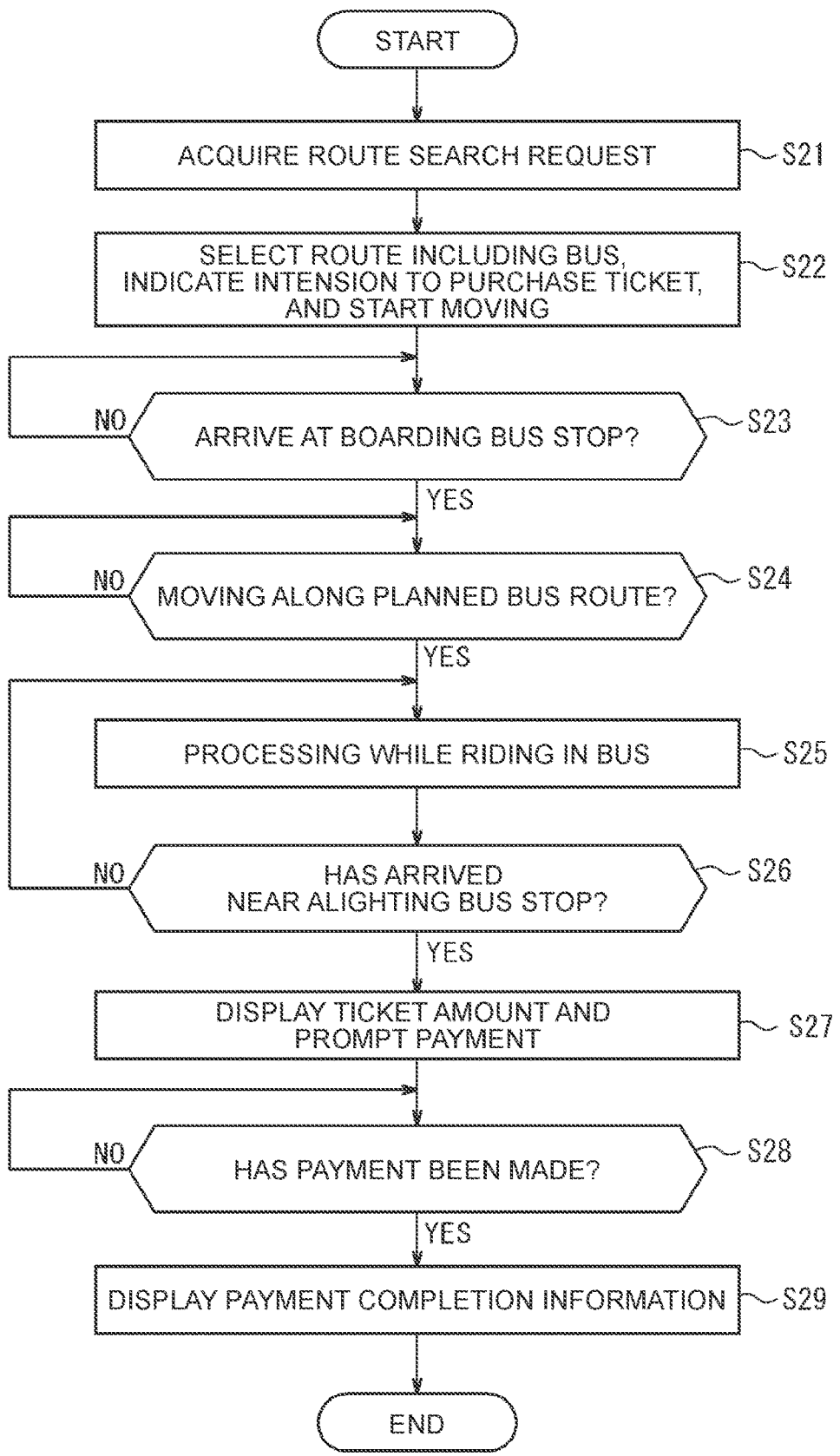
FIG. 4 is a flowchart illustrating an example of a procedure of a method executed by a terminal device.

The terminal device 20 functioning as the route guidance device may execute the route guidance method including the procedure of the flowchart illustrated in FIG. 4 in order to guide the route traveled by the user. The route guidance method may be implemented as a route guidance program to be executed by a processor of the terminal device 20. The route guidance program may be stored in a non-transitory computer-readable medium.

Figure 5:
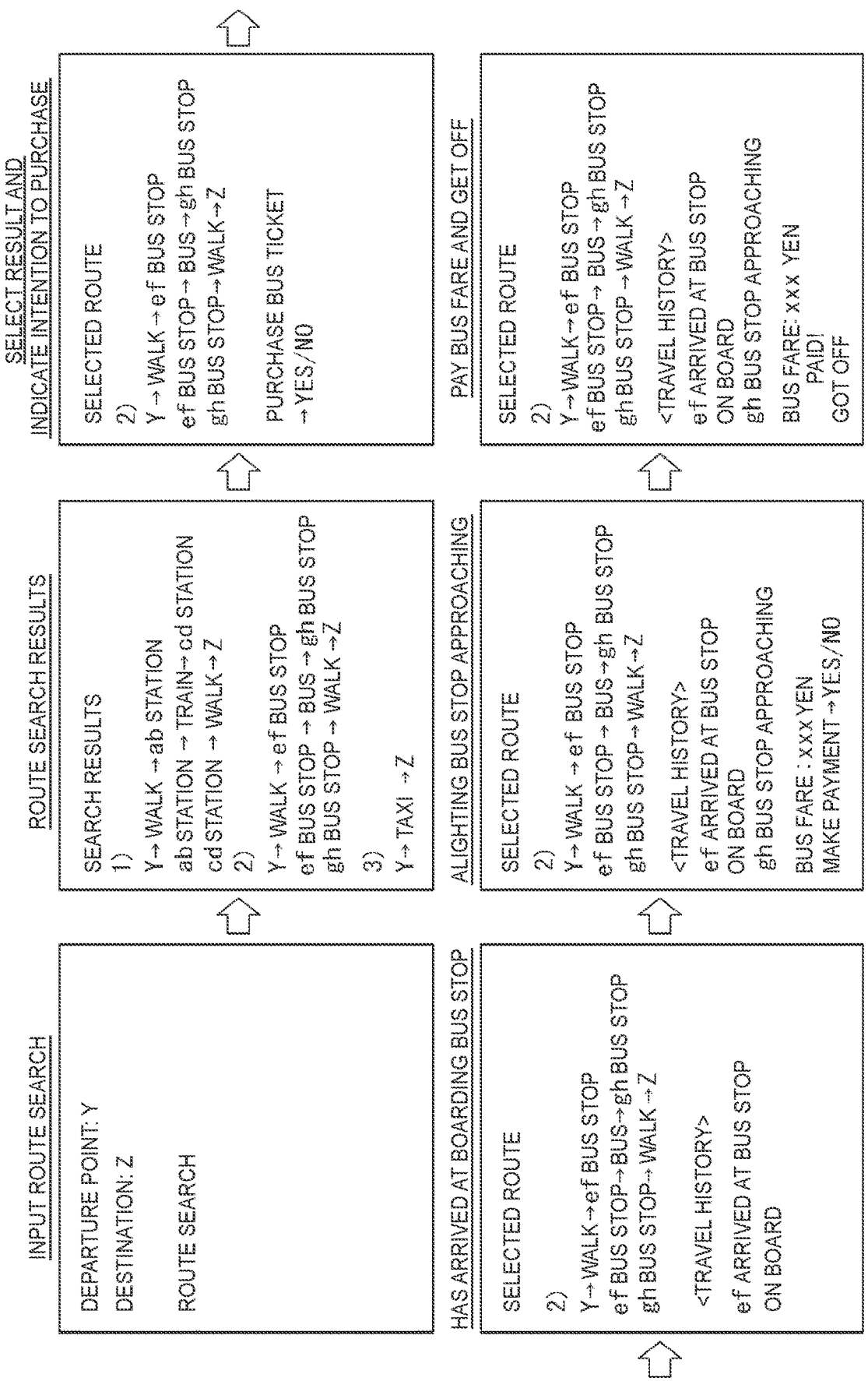
FIG. 5 is a diagram illustrating an exemplary screen displayed on the terminal device.

The terminal device 20 receives an input of a route search operation from the user, and requests the center system 10 to perform a route search (S21). When receiving the input of the route search operation, the terminal device 20 may display the screen of the route search input illustrated in FIG. 5 on the screen display unit 21. In the example of FIG. 5, the departure point is set to Y and the destination is set to Z.

The center system 10 outputs the search result of the route to the terminal device 20. The terminal device 20 may display the screen of the route search result illustrated in FIG. 5 on the screen display unit 21. In the example of FIG. 5, three candidate routes (1), (2), and (3) are displayed as the search result of the route. The route of (1) is a route that moves on foot from the departure point (Y) to ab station, travels by train from ab station to cd station, and travels on foot from cd station to the destination (Z). The route of (2) is a route that moves on foot from the departure point (Y) to ef bus stop, moves on bus from ef bus stop to gh bus stop, and moves on foot from gh bus stop to the destination (Z). The route of (3) is a route that moves from the departure point (Y) to the destination (Z) by taxi.

The terminal device 20 causes the user to select a route from at least one candidate route included in the search result of the route. The terminal device 20 outputs the selected route to the center system 10, and when the route including the bus section is selected, outputs the boarding ticket purchase intention indication to the center system 10, and causes the user to start moving (S22). The terminal device 20 may display the screen of the result selection and the purchase intention display illustrated in FIG. 5 on the screen display unit 21. In the example of FIG. 5, the route (2) in the candidate route is selected and displayed as the selected route. Also, a confirmation of whether to purchase a bus ticket is displayed. The boarding ticket purchase intention indication may be replaced with a reservation to purchase a boarding ticket. The user indicates an intention to purchase the ticket by selecting a YES to confirm whether to purchase the ticket.

The terminal device 20 determines whether the user has arrived at the boarding bus stop based on the location information of the terminal device 20 itself and the location of the boarding bus stop (S23). The terminal device 20 may determine that the user has arrived at the boarding bus stop when the distance between the location of the terminal device 20 itself and the location of the boarding bus stop becomes less than the predetermined distance. When it is determined that the user has not arrived at the boarding bus stop (S23: NO), the terminal device 20 repeats the determination process (S23).

When it is determined that the user has arrived at the boarding bus stop (S23: YES), the terminal device 20 determines whether the user is getting on the bus and moving along the scheduled bus route (S24). The terminal device 20 may determine whether the user is moving along the bus route based on the location information of the terminal device 20 itself. The terminal device 20 may determine whether the user gets on the bus and is moving along the bus route based on the location information of the terminal device 20 itself and the location information of the bus. The terminal device 20 may display, on the screen display unit 21, the screen of arrival at the bus stop illustrated in FIG. 5, prior to executing the determination process (S24) or while executing the determination process (S24). In FIG. 5, it is indicated that the user has ef arrived at the bus stop and that the user is getting on the bus. When the terminal device 20 does not determine that the user is moving along the bus route (S24: NO), the determination process (S24) is repeated.

When the distance between the bus and the user is less than the pre-boarding threshold, the terminal device 20 may acquire the location information of the terminal device 20 more frequently than when the distance between the bus and the user is equal to or greater than the pre-boarding threshold. The terminal device 20 may increase the frequency of outputting the location information of the terminal device 20 to the center system 10 when the distance between the bus and the user is less than the pre-boarding threshold. In other words, when the distance between the bus and the user is less than the pre-boarding threshold, the center system 10 or the terminal device 20 may acquire the location information of the user more frequently than when the distance between the bus and the user is equal to or greater than the pre-boarding threshold. In this way, the route guidance device can reduce the amount of communication of the location information while maintaining the accuracy of determining whether the user has ridden on the bus.

When it is determined that the user is traveling along the bus route (S24: YES), the terminal device 20 executes a process of getting on the bus (S25). The terminal device 20 may output the location information of the terminal device 20 itself as the location information of the user to the center system 10 as the processing during the bus ride. The terminal device 20 may reduce the frequency of acquiring the location information of the terminal device 20 when the user is getting on the bus and the distance to the bus stop is equal to or greater than the on-board threshold. The terminal device 20 may reduce the frequency of outputting the location information of the terminal device 20 to the center system 10 when the user is getting on the bus and the distance to the boarding bus stop is equal to or greater than the on-board threshold. In other words, in a case where the distance between the location of the alighting bus stop and the location of the user is equal to or greater than the on-board threshold, the center system 10 or the terminal device 20 may obtain the location information of the user less frequently than in a case where the distance between the location of the alighting bus stop and the location of the user is less than the on-board threshold. By changing the acquisition frequency of the location information, the route guidance device can reduce the communication amount of the location information while maintaining the accuracy of determining whether the user gets off the bus. The terminal device 20 may execute other processing as the processing during the bus ride, not limited to the change of the acquisition frequency of the location information.

Based on the location information of the terminal device 20 itself or the location information of the bus and the location of the alighting bus stop, the terminal device 20 determines whether the bus on which the user rides has arrived in the vicinity of the alighting bus stop (S26). When the distance between the location information of the terminal device 20 itself or the location information of the bus and the location of the alighting bus stop becomes less than the predetermined distance, the terminal device 20 may determine that the bus on which the user gets in has arrived near the alighting bus stop. When the bus on which the user is boarding has arrived near the alighting bus stop, the center system 10 outputs the bus fare information and the boarding ticket screen display information to the terminal device 20. When the bus fare information and the boarding ticket screen display information are acquired from the center system 10, the terminal device 20 may determine that the bus on which the user is boarding has arrived in the vicinity of the alighting bus stop. If the terminal device 20 does not determine that the user has arrived in the vicinity of the alighting bus stop (S26: NO), the process returns to the process (S25) while the user is getting on the bus.

When the terminal device 20 determines that the bus on which the user is boarding has arrived in the vicinity of the alighting bus stop (S26: YES), it displays a ticket amount on the display unit 21 to prompt the user to make a payment of the fare (S27). The terminal device 20 may acquire the bus fare information and the boarding ticket screen display information from the center system 10 before determining that the bus on which the user is boarding has arrived in the vicinity of the alighting bus stop. The terminal device 20 may acquire the bus fare information and the boarding ticket screen display information from the center system 10 after determining that the bus on which the user is boarding has arrived in the vicinity of the alighting bus stop.

The terminal device 20 may display, on the screen display unit 21, a screen illustrated in FIG. 5 for approaching the bus stop. In the exemplary embodiment of FIG. 5, the status of the user is approaching gh bus stop, the bus fare information, and the confirmation of whether to pay the bus fare are displayed.

The user instructs the payment of the bus fare by selecting a YES to confirm whether to pay the bus fare. The terminal device 20 outputs an instruction to process a payment of the bus fare from the user to the center system 10. In a case where an instruction to process a payment of the bus fare is acquired from the terminal device 20, the center system 10 processes a payment and notifies the terminal device 20 that the payment is completed.

The terminal device 20 determines whether the payment has been executed (S28). The terminal device 20 may determine that the payment has been processed when the payment completion notification is acquired from the center system 10. If it is not determined that the payment has been processed (S28: NO), the terminal device 20 repeats the determination process (S28).

When it is determined that the payment has been executed (S28: YES), the terminal device 20 displays the payment completion data on the display unit 21 (S29). The terminal device 20 may display, on the screen display unit 21, the screen of the bus fare payment and the getting off illustrated in FIG. 5. In the example of FIG. 5, it is displayed that the bus fare has been paid and that the user has got off. The user displays a screen indicating that the bus fare has been paid to the driver of the bus and gets off the bus. After executing S29 procedure, the terminal device 20 ends the execution of the procedure of the flow chart of FIG. 4.

BRIEF SUMMARY

As described above, in the route guidance device according to the present embodiment, when the bus section is included in the route selected by the user, the user can specify the boarding bus stop and the alighting bus stop based on the location information of the user, and process a payment of the bus fare. This eliminates the need for an operation of recording or inputting the getting on and off when the user gets on and off the bus. As a result, more seamless travel is implemented. In addition, the amount of communication for recording and inputting of getting on and off the bus by the user is reduced.

In addition, the route guidance device according to the present embodiment can specify a bus route that the user rides on the basis of a result of searching for a route in advance. In this case, the route guidance device can determine whether the user has approached the bus stop based on the distance between the location of the bus stop included in the search result of the route and the location of the user. That is, the route guidance device can determine whether the user has approached the bus stop used by the user in a state in which the location of the boarding bus stop and the alighting bus stop is recognized in advance. As a result, the boarding bus stop and the alighting bus stop are specified with higher accuracy than in the case where the bus stop used by the user is simply specified based on the location information of the user.

Other Embodiments

Hereinafter, a configuration example of the information processing system 1 according to another embodiment will be described.

Application to Vehicles Other than Buses

In the embodiments described above, an operation example in the case where the vehicle is a bus has been described. The route guidance device according to the present disclosure can be applied to a vehicle in which a fare is calculated based on a boarding location to the vehicle and an alighting location from the vehicle, and can also be applied to, for example, a train. When the vehicle is a train, the route guidance device may operate so that the user can process a payment of the fare without passing through the ticket gate. In this case, the route guidance device may be configured so as to be able to be set in advance so as to automatically process a payment without requesting the user to confirm the payment.

When the route guidance device is applied to a vehicle other than the bus, the operation of the route guidance device is described as follows. The route guidance device may determine, based on the location information of the vehicle associated with the route selected by the user and the location information of the user, whether the user has ridden on the vehicle associated with the route selected by the user. The route guidance device may determine a location at which the user gets out of the vehicle when the user gets out of the vehicle, and process a payment of a fare of the vehicle. The route guidance device may acquire the location information of the user or the location information of the vehicle associated with the route selected by the user more frequently than when the distance between the vehicle associated with the route selected by the user and the user is equal to or greater than the pre-boarding threshold when the distance between the vehicle and the user is less than the pre-boarding threshold. The route guidance device may acquire the location information of the user less frequently than when the distance between the alighting location of the vehicle associated with the route selected by the user and the location of the user is equal to or greater than the on-board threshold and the distance between the alighting location and the location of the user is less than the on-board threshold.

Figure 6:
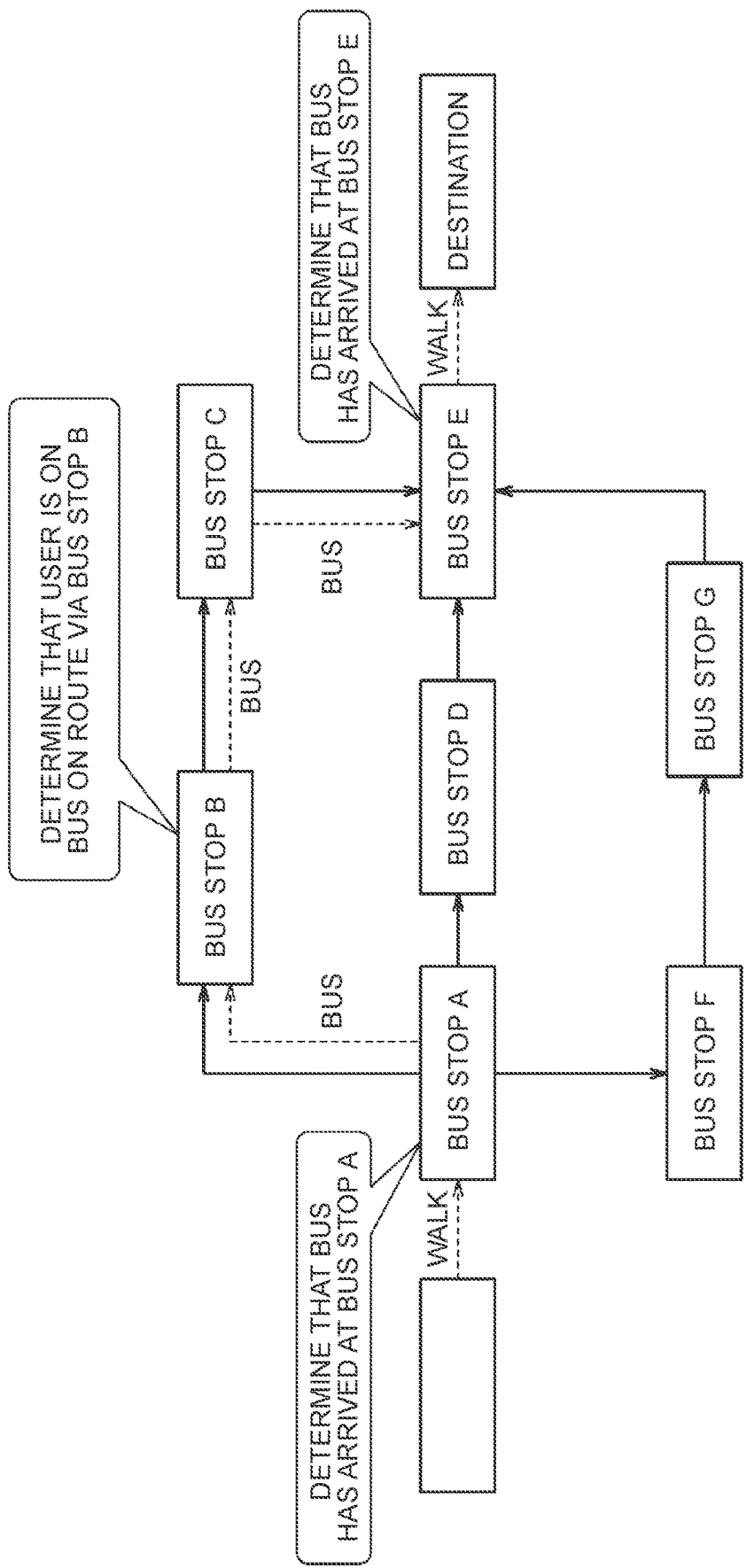
FIG. 6 is a diagram illustrating an example in which a plurality of operation routes exist.

In the case where the boarding bus stop and the alighting bus stop take on a bus that operates a common route In the above-described embodiment, the center system 10 determines that the user gets on the bus at the bus stop in the bus section included in the route selected by the user, and the user gets off at the bus stop, and processes a payment of the bus fare. Here, as illustrated in FIG. 6, a bus may operate in a plurality of operation routes from a bus stop A, which is a boarding bus stop, to a bus stop E, which is a alighting bus stop. The bus stop A, which is a boarding bus stop, corresponds to an ef bus stop in the embodiment of FIG. 5. The bus stop E, which is an alighting bus stop, corresponds to a gh bus stop in the exemplary embodiment of FIG. 5. In the example of FIG. 6, as an operation route from the bus stop A to the bus stop E, there are a route passing through the bus stops B and C, a route passing through the bus stop D, and a route passing through the bus stops F and G. When the travel distances of the respective operation routes are different, the riding fares of the respective operation routes are different. In this case, even if the center system 10 specifies the location of the boarding bus stop and the location of the alighting bus stop, it may not be possible to accurately calculate the fare of the actual operation route of the bus that the user has boarded.

Therefore, the center system 10 may specify the operation route of the bus based on the location information of the user when the user is on the bus or the location information of the bus on which the user is on the bus. For example, the center system 10 determines that the user has ridden on the bus after determining that the user has arrived at the bus stop A from the departure point, and determines that the user is riding on the bus of the route passing through the bus stop B when determining that the bus on which the user is riding has passed through the bus stop B. When it is determined that the user has arrived at the nearest bus stop E at the destination, the center system 10 calculates the bus fare of the route passing through the bus stop B, outputs the calculated bus fare to the terminal device 20, and processes a payment of the bus fare. That is, the route guidance device may calculate the fare of the user on the basis of the other route when the user is riding on a vehicle that is operated on the other route than the vehicle associated with the route selected by the user.

The route guidance device according to the present disclosure can identify, with high accuracy, which route the user has boarded on the bus, even in a complicated bus route, by acquiring the information of the user's boarding bus stop and the alighting bus stop based on the route searched in advance.

How to Provide MaaS

As an example, the route guidance device may be used to provide Mobility as a Service (MaaS), which is a service that utilizes mobility. As an example, the route guidance method illustrated in FIG. 3 or FIG. 4 may be executed when providing a MaaS using a vehicle such as a bus. In this case, the route guidance method including the above-described steps is an exemplary method of providing a MaaS using a vehicle such as a bus.

While embodiments of the present disclosure have been described with reference to the drawings and examples, it is noted that various changes and modifications can be made by those skilled in the art based on the present disclosure. It should be noted, therefore, that these modifications and alterations are within the scope of the present disclosure. For example, the functions and the like included in each means or each procedure and the like can be rearranged so as not to logically contradict each other, and a plurality of means or procedures and the like can be combined or divided into one.

What is claimed is:

1. A route guidance device for use with public transportation, the device comprising:
   a communication interface configured to communicate with a user terminal having a location information acquisition unit; and
   a processor operatively connected to the communication interface, the processor being programmed to:
      receive, via the communication interface, a route search request for a travel route including a destination and a departure point;
      calculate a route to the destination, a portion of the route to the destination including travel on a public transportation vehicle along a selected public transportation route, the selected public transportation route including a boarding stop where a user of the user terminal will board the public transportation vehicle and an exit stop where the user will exit the public transportation vehicle;
      transmit, via the communication interface, the calculated route to the user terminal;
      determine whether the user has boarded the public transportation vehicle by:
         receiving, via the communication interface, a first position of the user terminal detected by the location information acquisition unit;
         receiving via the communication interface, a second position of the user terminal detected by the location information acquisition unit;
         accessing map data and determining whether the received first position of the user terminal is within a first predetermined distance of the boarding stop;
         accessing public transportation information and determining whether the received second position of the user terminal is along the selected public transportation route; and
         determining that the user has boarded the public transportation vehicle when (i) the received first position of the user terminal is within a first predetermined distance of the boarding stop, and (ii) the received second position of the user terminal is along the selected public transportation route;
      in response to the determination that the user has boarded the public transportation vehicle, determine whether the user is approaching the exit stop by:
         receiving, via the communication interface, a third position of the user terminal detected by the location information acquisition unit;
         accessing the public transportation information and determining whether the received third position of the user terminal is within a second predetermined distance of the exit stop;
         determining that the user is approaching exit stop when the received third position of the user terminal is within a second predetermined distance of the exit stop; and
      in response to the determination that the user is approaching the exit stop:
         access public transportation fare information, and calculate a fare to be charged to the user for travel along the selected public transportation route;
         process payment of the calculated fare; and
         transmit a notification to the user terminal via the communication interface, and amount of the payment and a confirmation that the payment has been processed.

2. The route guidance device according to claim 1, wherein:
   the processor is programmed to:
      check whether a user is on an alternate public transportation route to the exit stop that is different from the selected public transportation route by:
         receiving, via the communication interface, a fourth position of the user terminal detected by the location information acquisition unit;
         accessing the public transportation information and determining whether the received fourth position of the user terminal is along the alternate route;
         determining that the user is on the alternate public transportation route when the received fourth position of the user terminal is along the alternate route; and
      calculating the fare to be charged to the user comprises accessing the public transportation fare information and calculating the fare to be charged to the user based on the alternate public transportation route.

3. The route guidance device according to claim 1, wherein the processor is programed to:
   periodically update the first position of the user terminal; and
   periodically receive, via the communication interface, a location of a public transportation vehicle traveling along the selected public transportation route;
   determine whether a distance from the first position of the user terminal to the received location of the public transportation vehicle is within a pre-boarding threshold; and
   in response to a determination that the distance from the first position of the user terminal to the received location of the public transportation vehicle is within the pre-boarding threshold, increase at least one of:
      a frequency of updating the first position of the user terminal; and
      a frequency of receiving the location of a public transportation vehicle.

4. The route guidance device according to claim 1, wherein the processor is programed to:
   periodically update the third position of the user terminal;
   determine whether the distance from the third position of the user terminal to the exit stop is within an on-board threshold; and
   in response to a determination that the distance from the third position of the user terminal to the exit stop is within the on-board threshold, increase a frequency of updating the third position of the user terminal.

5. A Mobility as a Service providing method using a route guidance device including a communication interface configured to communicate with a user terminal having a location information acquisition unit, and a processor operatively connected to the communication interface, the method causing the processor to implement functions comprising:
   receiving, via the communication interface, a route search request for a travel route including a destination and a departure point;

calculating a route to the destination, a portion of the route to the destination including travel on a public transportation vehicle along a selected public transportation route, the selected public transportation route including a boarding stop where a user of the user terminal will board the public transportation vehicle and an exit stop where the user will exit the public transportation vehicle;

transmitting, via the communication interface, the calculated route to the user terminal;

determining whether the user has boarded the public transportation vehicle by:
- receiving, via the communication interface, a first position of the user terminal detected by the location information acquisition unit;
- receiving via the communication interface, a second position of the user terminal detected by the location information acquisition unit;
- accessing map data and determining whether the received first position of the user terminal is within a first predetermined distance of the boarding stop;
- accessing public transportation information and determining whether the received second position of the user terminal is along the selected public transportation route; and
- determining that the user has boarded the public transportation vehicle when (i) the received first position of the user terminal is within a first predetermined distance of the boarding stop, and (ii) the received second position of the user terminal is along the selected public transportation route;

in response to the determination that the user has boarded the public transportation vehicle, determining whether the user is approaching the exit stop by:
- receiving, via the communication interface, a third position of the user terminal detected by the location information acquisition unit;
- accessing the public transportation information and determining whether the received third position of the user terminal is within a second predetermined distance of the exit stop;
- determining that the user is approaching exit stop when the received third position of the user terminal is within a second predetermined distance of the exit stop; and in response to the determination that the user is approaching the exit stop:
- accessing public transportation fare information, and calculate a fare to be charged to the user for travel along the selected public transportation route;
- processing payment of the calculated fare; and
- transmitting a notification to the user terminal via the communication interface, and amount of the payment and a confirmation that the payment has been processed.

* * * * *